United States Patent
Nakato et al.

(10) Patent No.: US 7,618,732 B2
(45) Date of Patent: *Nov. 17, 2009

(54) FUEL CELL ELECTROLYTE, MEMBRANE ELECTRODE ASSEMBLY, AND METHOD OF MANUFACTURING FUEL CELL ELECTROLYTE

(75) Inventors: Kunihiro Nakato, Gunma (JP); Atsuo Sonai, Kanagawa (JP)

(73) Assignees: Sanyo Electric Co., Ltd., Osaka (JP); Samsung Electronics Co., Ltd., Gyeonggi-Do (KR); Samsung SDI Co., Ltd., Gyeonggi-Do (KR)

(*) Notice: Subject to any disclaimer, the term of this patent is extended or adjusted under 35 U.S.C. 154(b) by 133 days.

This patent is subject to a terminal disclaimer.

(21) Appl. No.: 11/701,397

(22) Filed: Feb. 2, 2007

(65) Prior Publication Data

US 2007/0202376 A1 Aug. 30, 2007

(30) Foreign Application Priority Data

Feb. 24, 2006 (JP) .............................. 2006-049340

(51) Int. Cl.
*H01M 8/10* (2006.01)
(52) U.S. Cl. ....................................................... 429/33
(58) Field of Classification Search ........................ None
See application file for complete search history.

(56) References Cited

U.S. PATENT DOCUMENTS

| | | | |
|---|---|---|---|
| 5,525,436 A * | 6/1996 | Savinell et al. ................. | 429/30 |
| 6,733,927 B1 * | 5/2004 | Takezawa et al. ............ | 429/307 |
| 2004/0224218 A1 * | 11/2004 | Fan ............................... | 429/44 |
| 2005/0084727 A1 * | 4/2005 | Kiefer et al. .................. | 429/33 |
| 2005/0118476 A1 * | 6/2005 | Melzner et al. ............... | 429/33 |
| 2007/0154778 A1 * | 7/2007 | Haufe et al. ................... | 429/42 |

FOREIGN PATENT DOCUMENTS

| | | |
|---|---|---|
| JP | 11-503262 A | 3/1999 |
| JP | 2002-319414 | 10/2002 |
| JP | 2002-533890 | 10/2002 |
| JP | 2007-519183 | 7/2007 |
| WO | WO 96/13872 A1 | 5/1996 |
| WO | WO03/043116 A1 * | 5/2003 |
| WO | WO 03/043116 A1 | 5/2003 |
| WO | WO03/074596 A1 * | 9/2003 |
| WO | WO 2005-063852 | 7/2005 |

OTHER PUBLICATIONS

Japanese Office Action, with English translation, issued in Japanese Patent Application No. JP 2006-049340 dated on Jul. 15, 2008.
Japanese Notification of Reasons for Refusal, with English Translation, issued in Japanese Patent Application No. JP 2006-049339, dated Mar. 24, 2009.

* cited by examiner

*Primary Examiner*—Patrick Ryan
*Assistant Examiner*—Muhammad Siddiquee
(74) *Attorney, Agent, or Firm*—McDermott Will & Emery LLP

(57) ABSTRACT

A fuel cell electrolyte comprises: a basic polymer; an organic phosphonic acid expressed by the following general formula (1); and a hydrolyzable phosphate compound expressed by the following general formula (2):

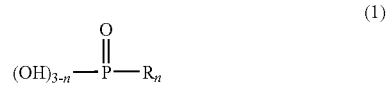

(1)

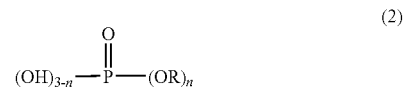

(2)

where R represents an alkyl, aryl, acyl, amino, phosphonic group or a derivative of the functional group, and n is 1 or 2, and R represents an alkyl or alkoxyalkyl group, and n is 1 or 2.

16 Claims, 6 Drawing Sheets

FUEL CELL ELECTROLYTE, MEMBRANE ELECTRODE ASSEMBLY, AND METHOD OF MANUFACTURING FUEL CELL ELECTROLYTE

BACKGROUND OF THE INVENTION

1. Field of the Invention

The invention relates to a fuel cell, and more particularly to a fuel cell electrolyte membrane and a membrane electrode assembly which can be used for a fuel cell capable of operation under a nonhumidified state.

2. Description of the Related Art

Solid polymer type fuel cells having an electrolyte made of a solid polymer film have been known. The solid polymer type fuel cells use proton conductive polymer electrolyte membranes for their electrolytes. In general, a solid polymer type fuel cell includes an anode (fuel electrode), a cathode (oxidant electrode), and a polymer electrolyte membrane interposed between the anode and the cathode. The anode of the solid polymer type fuel cell is provided with a catalyst layer for promoting oxidation of the fuel. The cathode of the solid polymer type fuel cell is provided with a catalyst layer for promoting reduction of the oxidant.

The fuel to be supplied to the anode of the solid polymer type fuel cell is typically made of hydrogen, a hydrogen-containing gas, a mixed vapor of methanol and water, a methanol aqueous solution, or the like. The oxidant to be supplied to the cathode of the solid polymer type fuel cell is typically made of oxygen, an oxygen-containing gas, or air.

The polymer electrolyte membrane is typically made of sulfonate high-fluorinated polymer which has a backbone chain composed of fluorinated alkylene and a side chain composed of fluorinated vinyl ether having a sulfonic acid group at the end. This type of polymer electrolyte membrane exhibits ion conductivity sufficient for power generation when impregnated with an appropriate amount of water.

For this reason, the conventional solid polymer type fuel cells have required water management on their polymer electrolyte membranes, thereby causing complicated and large-sized fuel cell systems.

To solve these problems ascribable to the water management on the polymer electrolyte membranes, a nonhumidified electrolyte membrane capable of conducting protons under a nonhumidified state has been developed as an alternative to the conventional polymer electrolyte membranes.

For example, the patent document No. 1 discloses a non-humidified polymer electrolyte membrane which is made of such a material as polybenzimidazole doped with phosphoric acid.

Patent document No. 1

JP 11-503262

When a polybenzimidazole or other basic polymer film is doped with phosphoric acid, the basic polymer film makes dimensional changes because of moisture absorption of the phosphoric acid. Moreover, when the phosphoric acid absorbs moisture, it comes out of the basic polymer film. As a result, the basic polymer film shrinks to cause wrinkles therein. Consequently, the storage of the produced basic polymer film and the fabrication of a membrane electrode assembly or a stack require special environmental facilities including a dry room. This produces such problems as a manufacturing difficulty and an increased manufacturing cost.

SUMMARY OF THE INVENTION

In this background, a general purpose of the present invention is to provide a fuel cell electrolyte which contains a basic polymer whose dimensional changes before and after acid doping are suppressed for lower production of wrinkles. Another general purpose of the preset invention is to provide a membrane electrode assembly which is composed of a fuel cell electrolyte containing a basic polymer and has improved gas diffusibility.

An embodiment of the present invention relates to a fuel cell electrolyte. The fuel cell electrolyte comprises: a basic polymer; an organic phosphonic acid expressed by the following general formula (1); and a hydrolyzable phosphate compound expressed by the following general formula (2):

where R represents an alkyl, aryl, acyl, amino, phosphonic group or a derivative of the functional group, and n is 1 or 2, and R represents an alkyl or alkoxyalkyl group, and n is 1 or 2.

The fuel cell electrolyte has a level of proton conductivity equivalent to that of conventional fuel cell electrolytes while dimensional changes and wrinkles thereof are suppressed.

The basic polymer in the fuel cell electrolyte of this embodiment is preferably selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles. The basic polymer in the fuel cell electrolyte of this embodiment may contain poly-2,5-benzimidazole.

The basic polymer in the fuel cell electrolyte of this embodiment may be cross-linked. As a result of this, the rigidity of the basic polymer is improved and the fuel cell electrolyte is less likely to shrink and expand.

The organic phosphonic acid in the fuel cell electrolyte of this embodiment is preferably selected from the group consisting of ethylphosphonic acid, methylphosphonic acid and octylphosphonic acid. The organic phosphonic acid may be expressed by the following general formula (3):

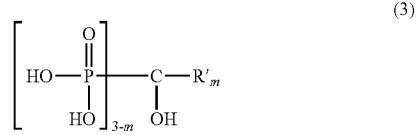

where R' represents an alkyl, aryl, acyl, amino, phosphonic group or a derivative of the functional group, and m is 1 or 2.

The phosphate compound in the fuel cell electrolyte of this embodiment may be selected from the group consisting of ethyl acid phosphate, methyl acid phosphate, butyl acid phosphate, oleyl acid phosphate, and dibutyl phosphate. The phosphate compound may be selected from the group consisting of monoethyl phosphate, monomethyl phosphate, mono-n-butyl phosphate, and mono-n-octyl phosphate.

The fuel cell electrolyte of this embodiment may be doped with 800 mol % or less, or, more preferably, 200 mol % or less of phosphoric acid with respect to the basic polymer as a reference. Such a formulation controls moisture absorption by phosphoric acid and improves aging time of a cell voltage.

The fuel cell electrolyte according to this embodiment may have a water content of 20% or less. The definition of the water content will be given later. The fuel cell electrolyte according to this embodiment may have an expansion ratio of 20% or less. The definition of the expansion ratio will be given later.

Another embodiment of the present invention relates to a membrane electrode assembly. The membrane electrode assembly comprises: the fuel cell electrolyte mentioned above; an anode joined to one side of the fuel cell electrolyte; and a cathode joined to another side of the fuel cell electrolyte, wherein at least one of the anode and the cathode contains the organic phosphonic acid expressed by the general formula (1) and/or the hydrolyzable phosphate compound expressed by the general formula (2).

By using a fuel cell electrolyte which has a level of proton conductivity equivalent to that of conventional fuel cell electrolytes while dimensional changes and wrinkles thereof are suppressed, manufacturing the membrane electrode assembly requires no special facility such as a dry room, and the manufacturing cost is reduced accordingly. Since at least one of the anode and the cathode is doped with the organic phosphonic acid, the interface resistance between the electrode (anode and/or cathode) and the fuel cell electrolyte decreases. Moreover, the gas diffusibility is remarkably improved.

At least one of the anode and the cathode in the membrane electrode assembly may contain the organic phosphonic acid selected from the group consisting of ethylphosphonic acid, methylphosphonic acid and octylphosphonic acid.

At least one of the anode and the cathode in the membrane electrode assembly may contain the phosphate compound selected from the group consisting of ethyl acid phosphate, methyl acid phosphate, butyl acid phosphate, oleyl acid phosphate, and dibutyl phosphate.

The total sum of the amount of the organic phosphonic acid and hydrolyzable phosphate compound contained in the fuel cell electrolyte, the amount of the organic phosphonic acid and hydrolyzable phosphate compound contained in the anode, and the amount of the organic phosphonic acid and hydrolyzable phosphate compound contained in the cathode may be in the range of 100% to 800% by mol with respect to the basic polymer. In this case, each of the amount of organic phosphonic acid and hydrolyzable phosphate compound contained in the fuel cell electrolyte, the amount of organic phosphonic acid and hydrolyzable phosphate compound contained in the anode and the amount of organic phosphonic acid hydrolyzable phosphate compound in the cathode is 5% by mol or more with respect to the basic polymer.

It is to be noted that any suitable combinations of the above-described elements may be encompassed by the scope sought to be protected by the present application.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
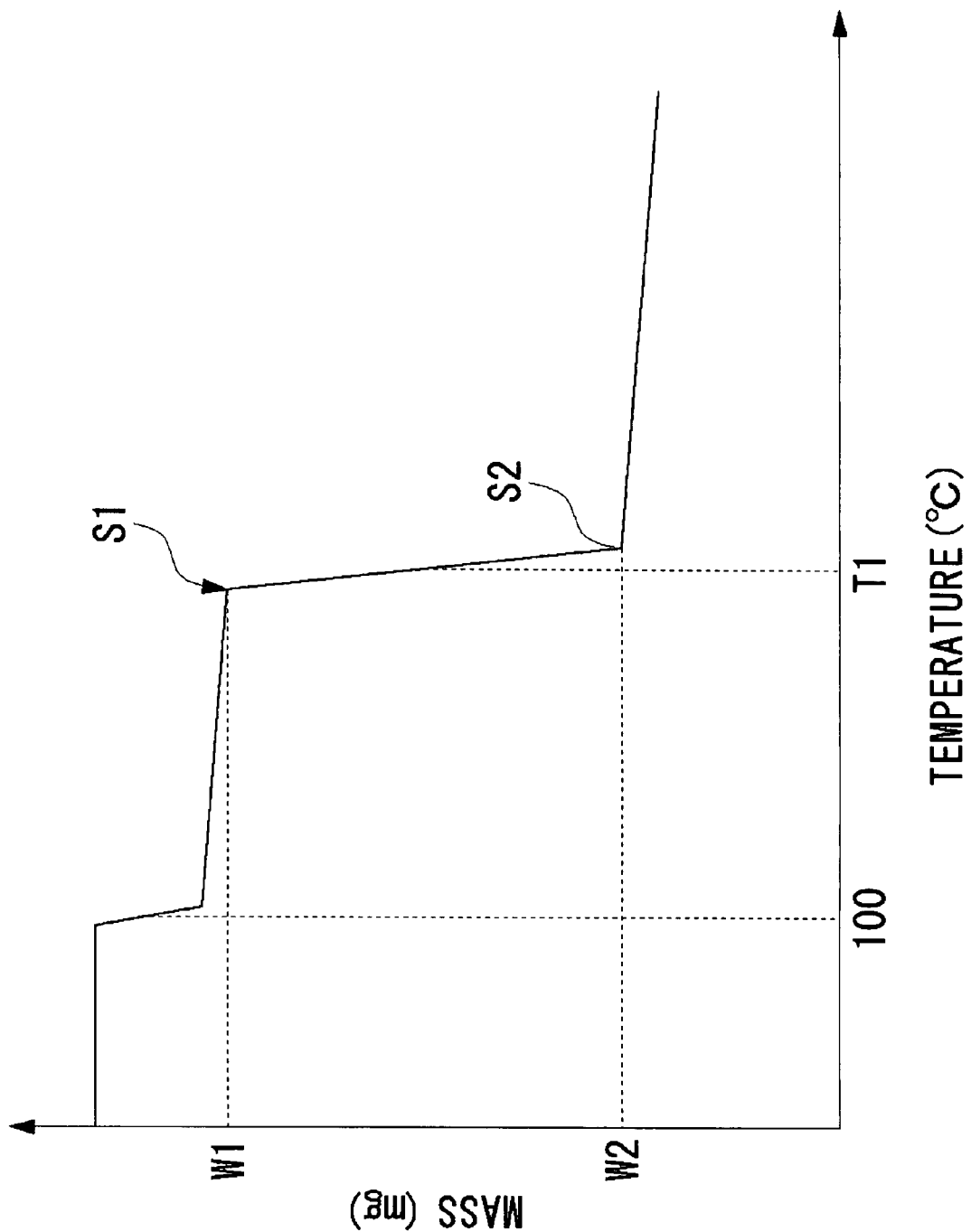
FIG. 1 is a diagram schematically showing a TG chart for calculating water content.

The invention will now be described by reference to the preferred embodiments. This does not intend to limit the scope of the present invention, but to exemplify the invention.

Embodiment 1

A fuel cell electrolyte according to the present embodiment contains a basic polymer, an organic phosphonic acid compound expressed by the following general formula (4) and a hydrolyzable phosphate compound expressed by the following general formula (5):

(4)

(5)

where R represents an alkyl, aryl, acyl, amino, phosphonic group or a derivative of the functional group, and n is 1 or 2, and R represents an alkyl or alkoxyalkyl group, and n is 1 or 2.

(Basic Polymer)

The basic polymer is preferably selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles. A polybenzimidazole may be a poly-2,5-benzimidazole.

It is preferable that the basic polymer be crosslinked by a cross-linking agent. Cross-linking the basic polymer improves the rigidity of the fuel cell electrolyte and controls elasticity. Any cross-linking agent suitable for the cross-linking reaction of the basic polymer may be employed. For example, urethane cross-linking agent may be used.

(Organic Phosphonic Acid)

Organic phosphonic acid is preferably selected from the group consisting of ethylphosphonic acid, methylphosphonic acid and octylphosphonic acid.

The organic phosphonic acid may be as expressed by a general formula (6) below.

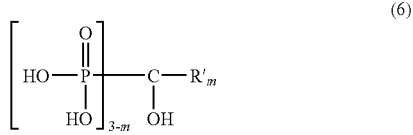

(6)

where R' represents an alkyl, aryl, acyl, amino, phosphonic group or a derivative of the functional group, and m is 1 or 2.

For example, the following expression (7) represents hydroxyethane diphosphonic acid (HEDP) derived by substituting m=1 and R'=CH3 into the expression (5). HEDP is available from Nippon Chemical Industrial CO., LTD by a product name Deflock EH06 (aqueous solution of 60% HEDP).

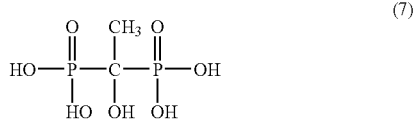

(7)

(Phosphate Compound)

If R in the formula (5) is an alkyl group, the phosphate compound is preferably selected from the group consisting of ethyl acid phosphate, methyl acid phosphate, butyl acid phosphate, oleyl acid phosphate, and dibutyl phosphate.

The phosphate compound is preferably selected from the group consisting of monoethyl phosphate, monomethyl phosphate, mono-n-butyl phosphate, and mono-n-octyl phosphate.

If R in the formula (5) is an alkoxyalkyl group, the phosphate compound preferably is butoxyethyl acid phosphate.

It is preferable that the hydrolyzable phosphate compound and organic phosphonic acid immersed in the fuel cell electrolyte be 5 mol % or more with respect to the basic polymer as a reference. If the amount of hydrolyzable phosphate compound and organic phosphonic acid added is less than 5 mol % with respect to the basic polymer as a reference, such functions as proton conductivity in the fuel cell electrolyte suffer.

The fuel cell electrolyte according to the present embodiment is suppressed to 20% or less, and preferably 10% or less, in the water content which is determined by a water content evaluation method to be described later.

The fuel cell electrolyte according to the present embodiment is also suppressed to 20% or less, and preferably 10% or less, in the expansion ratio which is determined by an expansion ratio evaluation method to be described later.

Since the basic polymer is doped with an organic phosphonic acid and hydrolyzable phosphate compound of low water absorption, the fuel cell electrolyte according to the present embodiment has the property of causing less dimensional changes and less wrinkles before and after the doping of the organic phosphonic acid and hydrolyzable phosphate compound.

The fuel cell electrolyte according to the present embodiment is obtained by impregnating the basic polymer with a mixture of an aqueous solution of organic phosphonic acid and an aqueous solution of hydrolyzable phosphate compound. After the impregnation, the water content of the organic phosphonic acid and hydrolyzable phosphate compound thus decreases gradually with time, such as at the process of drying, at the process of loading into a fuel cell, and in the stage of use as a product. After the fuel cell electrolyte is loaded in a fuel cell and the resulting product is operated under normal conditions such as at 150° C. with no humidification, the fuel cell electrolyte finally falls to a water content of approximately zero.

(Water Content Evaluation Method)

Hereinafter, description will be given of the method of evaluating the fuel cell electrolyte for water content.

Initially, thermogravimetric (TG) measurement is performed on the organic phosphonic acid and hydrolyzable phosphate compound themselves for the basic polymer to be doped with, thereby grasping a temperature T1 across which a sharp decrease in mass occurs from decomposition or dehydration of the organic phosphonic acid and hydrolyzable phosphate compound. Given that the temperature T1 is approximately 150° C. or higher, it is confirmed that the target sample of the water content measurement will decrease in mass, up to 100° C. or so, because of evaporation of the moisture contained in the sample independently of the organic phosphonic acid. It has been confirmed that none of the organic phosphonic acids mentioned above causes a sharp decrease in mass up to 160° C.

Next, TG measurement is performed on the target sample of the water content measurement. FIG. 1 schematically shows a TG chart for calculating the water content. In FIG. 1, the mass change across a temperature of 100° C. occurs from the evaporation of moisture contained in the sample independently of the organic phosphonic acid and hydrolyzable phosphate compound. The mass change across a temperature of T1 occurs from the decomposition or dehydration of the organic phosphonic acid and hydrolyzable phosphate compound. The sample is measured for weights W1 and W2 which correspond to inflection points S1 and S2 of the mass change across the temperature of T1, respectively. The water content is calculated by the equation: water content=(W1−W2)/W1× 100.

The temperatures corresponding to the respective inflection points S1 and S2 are suitably determined by differential thermogravimetry (DTG). In DTG, the positions of the inflection points S1 and S2 appear as peaks. The weights at the inflection points S1 and S2 can thus be determined from the peak positions in DTG.

(Expansion Ratio Evaluation Method)

Hereinafter, description will be given of the method of evaluating the fuel cell electrolyte for expansion ratio S. The expansion ratio S is calculated by the equation: S=(Y−X)/X× 100(%). Here, X is the length of a predetermined side of the fuel cell electrolyte before the basic polymer is doped with the organic phosphonic acid and hydrolyzable phosphate compound. Y is the length of the predetermined side of the fuel cell electrolyte at an arbitrary point in time after the basic polymer is doped with the organic phosphonic acid and hydrolyzable phosphate compound.

The fuel cell electrolyte of the first embodiment may be doped variously. For example, the fuel cell electrolyte of embodiment 1 may be doped with 800 mol % or less, or, more preferably, 200 mol % or less of phosphoric acid with respect to the basic polymer as a reference. By ensuring that the amount of phosphoric acid is 800 mol % or less with respect to the basic polymer as a reference, aging time of a cell voltage is improved, while controlling moisture absorption due to the phosphoric acid. Further, by ensuring that the amount of phosphoric acid is 200 mol % or less with respect to the basic polymer as a reference, aging time of a cell voltage is improved, while further controlling moisture absorption due to the phosphoric acid. In contrast, if the amount of phosphoric acid exceeds 800 mol % with respect to the basic polymer as a reference, moisture absorption control exercised by the hydrolyzable phosphate compound suffers and there will be marked size change in the fuel cell electrolyte.

Embodiment 2

A membrane electrode assembly according to the present embodiment is obtained by joining an anode to one of the sides of the foregoing fuel cell electrolyte, and joining a cathode to the other side of the fuel cell electrolyte.

The membrane electrode assembly of the present embodiment is characterized in that at least one of the anode and the cathode contains an organic phosphonic acid compound expressed by the aforementioned general formula (4) and a hydrolyzable phosphate compound expressed by the aforementioned general formula (5). The membrane electrode assembly of the present embodiment is composed of the fuel cell electrolyte which has a level of proton conductivity equivalent to that of conventional fuel cell electrolytes while dimensional changes and wrinkles thereof are suppressed. Consequently, manufacturing the membrane electrode assembly requires no special facility such as a dry room, and thus allows a reduction in the manufacturing cost. Since at least one of the anode and the cathode is doped with the organic phosphonic acid and hydrolyzable phosphate compound, the interface resistance between the electrode and the fuel cell electrolyte decreases. Moreover, the gas diffusibility is remarkably improved.

The anode or cathode doped with the organic phosphonic acid and/or hydrolyzable phosphate compound is obtained by coating the anode or cathode with an organic phosphonic acid and/or hydrolyzable phosphate compound and then drying it at 80° C. for 120 min. The drying temperature and the drying time may be changed as appropriate.

The organic phosphonic acid for at least one of the anode and the cathode to contain is preferably selected from the group consisting of ethylphosphonic acid, methylphosphonic acid and octylphosphonic acid. The phosphate compound for at least one of the anode and the cathode to contain is preferably selected from the group consisting of ethyl acid phosphate, methyl acid phosphate, butyl acid phosphate, oleyl acid phosphate, and dibutyl phosphate.

Further, the phosphate compound included in at least one of the anode and the cathode is preferably selected from the group consisting of monoethyl phosphate, monomethyl phosphate, mono-n-butyl phosphate, and mono-n-octyl phosphate.

In the membrane electrode assembly according to the present embodiment, the total sum of the amount of the organic phosphonic acid and hydrolyzable phosphate compound contained in the fuel cell electrolyte, the amount of the organic phosphonic acid and hydrolyzable phosphate compound contained in the anode, and the amount of the organic phosphonic acid and hydrolyzable phosphate compound contained in the cathode is preferably be in the range of 100% to 800% by mol with respect to the basic polymer. Each of the amount of organic phosphonic acid and hydrolyzable phosphate compound contained in the fuel cell electrolyte, the amount of organic phosphonic acid and hydrolyzable phosphate compound contained in the anode and the amount of organic phosphonic acid hydrolyzable phosphate compound in the cathode may be 5% by mol or more with respect to the basic polymer.

If the total sum of the amount of the organic phosphonic acid and hydrolyzable phosphate compound contained in the fuel cell electrolyte, the amount of the organic phosphonic acid and hydrolyzable phosphate compound contained in the anode, and the amount of the organic phosphonic acid and hydrolyzable phosphate compound contained in the cathode is within the range of 100% to 800% by mol with respect to the basic polymer, proton conductivities sufficient for the generation condition can be obtained. Therefore, only a smaller amount of organic phosphonic acid is required. It is therefore possible to lower the manufacturing cost of the membrane electrode assembly.

When both the anode and the cathode are doped with organic phosphonic acid and hydrolyzable phosphate compound, the anode is preferably doped with a greater amount of organic phosphonic acid and hydrolyzable phosphate compound than the cathode is.

If the membrane electrode assembly is further doped with phosphoric acid, the total sum of the amount of the organic phosphonic acid, hydrolyzable phosphate compound and phosphoric acid contained in the fuel cell electrolyte, the amount of the organic phosphonic acid, hydrolyzable phosphate compound and phosphoric acid contained in the anode, and the amount of the organic phosphonic acid, hydrolyzable phosphate compound and phosphoric acid contained in the cathode is preferably be in the range of 200% to 800% by mol with respect to the basic polymer. Each of the amount of organic phosphonic acid and hydrolyzable phosphate compound contained in the fuel cell electrolyte, the amount of organic phosphonic acid and hydrolyzable phosphate compound contained in the anode and the amount of organic phosphonic acid hydrolyzable phosphate compound in the cathode may be 5% by mol or more with respect to the basic polymer.

This can further decrease the interface resistance between the electrodes and the fuel cell electrolyte for yet improved gas diffusibility.

Example 1

Hereinafter, description will be given of the method of manufacturing a typical fuel cell electrolyte according to the present invention. Here, polybenzimidazole (PBI) was used as the basic polymer, ethylphosphonic acid as the organic phosphonic acid and monoethyl acid phosphate as the phosphate compound.

Initially, PBI (20%) was dissolved in LiCl(2%)-containing dimethylacetamide. The PBI solution was cast onto a glass plate to form a PBI film.

Next, 0.13 g of PBI film (0.00042 mol) was immersed in a beaker of 40% ethylphosphonic acid solution (solvent: water) at room temperatures for 2 hours. The ethylphosphonic acid solution is maintained at a temperature of 60° C. in the hot water. Subsequently, the PBI film was pulled out. The excess solvent adhering thereon was wiped off and removed with a wiping cloth, thereby completing the fuel cell electrolyte. The weight after the immersion was 0.22 g. As described later, the weight of the ethylphosphonic acid, or the dopant, was thus approximately 0.09 g (0.00081 mol) since the fuel cell electrolyte of this example has a water content of approximately zero. As a result, the doping ratio of the ethylphosphonic acid was 192% by mole with reference to PBI. Next, 0.13 g of 67% monoethyl acid phosphate solution (solvent: water) is spread and the fuel cell electrolyte is dried at 120° C. for 2 hours. As a result, the doping ratio of the monoethyl acid phosphate was 161% by mole with reference to PBI.

Comparative Example 1

For the sake of comparison with the Example 1, a fuel cell electrolyte was prepared from PBI doped with phosphoric acid.

Like the Example 1, a PBI film was formed, and then 0.15 g (0.00049 mol) of the PBI film was immersed in a beaker of 85% phosphoric acid solution at room temperatures for 24 hours. Subsequently, the PBI film was pulled out. The excess solvent adhering thereon was wiped off and removed with a wiping cloth, thereby completing the fuel cell electrolyte. The weight after the immersion was 0.58 g. As a result, the doping ratio of the phosphoric acid was 900% by mole with reference to PBI.

(Result of Evaluation on Water Content)

Figure 2:
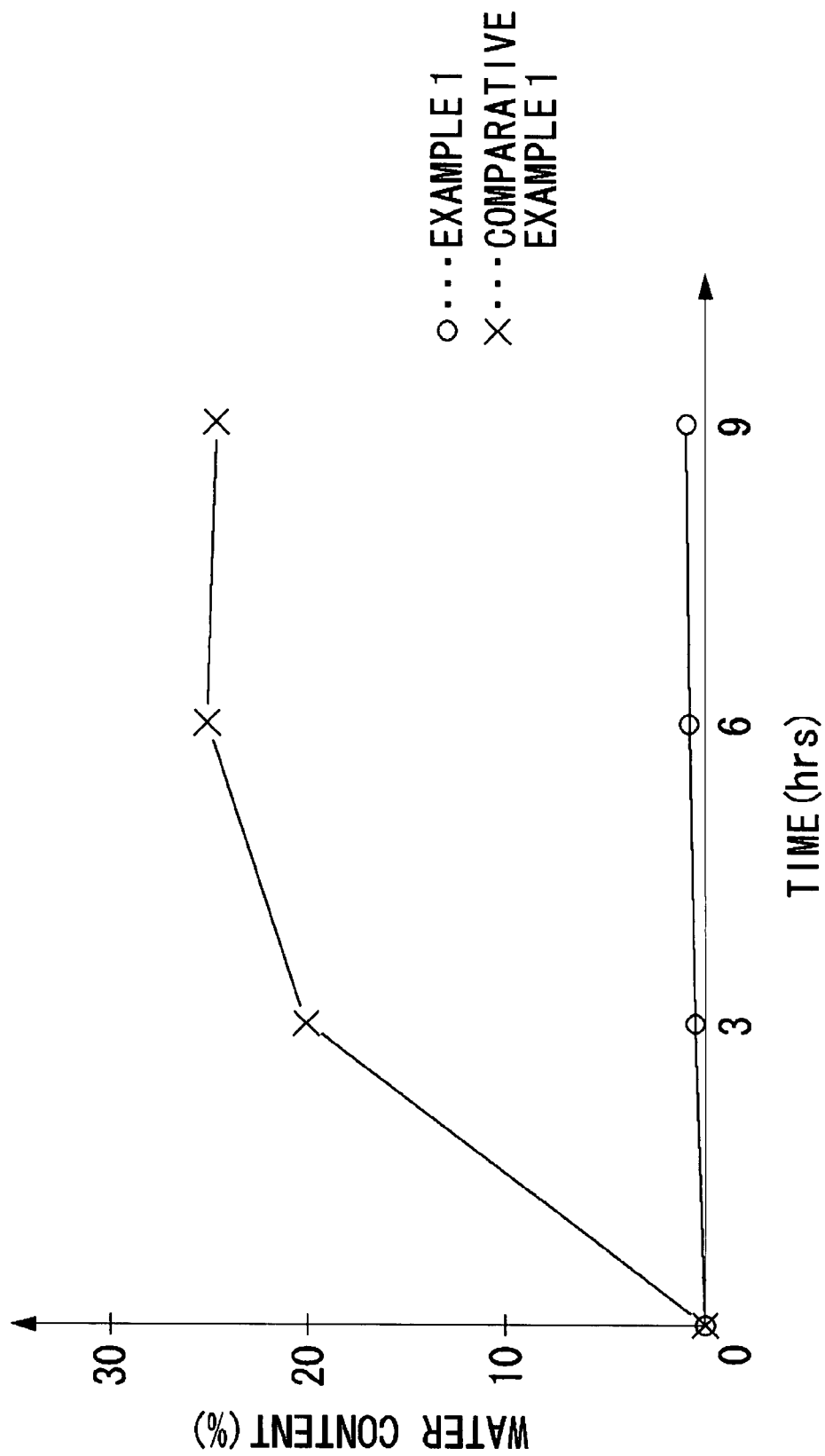
FIG. 2 is a graph for showing time dependence of the water contents of Example 1 and Comparative Example 1 which were stored at 22° C. and 62% RH after acid doping, the water contents being determined by a particular water content evaluation method.

FIG. 2 is a graph showing time dependence of the water contents of the Example 1 and the Comparative Example 1 which were stored at 22° C. and 62% RH after the acid doping. The water contents were measured by the water content evaluation method described above.

It is shown that the water content of the fuel cell electrolyte according to the Comparative Example 1 increases with a lapse of time due to the moisture absorption of the phosphoric acid. In the Comparative Example 1, the water content reached 25% after nine hours since the doping of the phosphoric acid. Moreover, in the Comparative Example 1, the absorption of atmospheric moisture in the fuel cell electrolyte swelled the fuel cell electrolyte in volume. The phenomenon that the phosphoric acid came out of the fuel cell electrolyte was also observed. Consequently, in the fuel cell electrolyte of the Comparative Example 1, the total weight of the phosphoric acid and the PBI seems to decrease with time.

On the other hand, the Example 1 caused little change in weight after the storage in the atmosphere. This confirms that the foregoing problems have been solved.

(Result of Evaluation on Expansion Ratio)

Table 1 shows the expansion ratios of the fuel cell electrolytes according to the Example 1 and the Comparative Example 1, before and after the doping of monoethyl acid phosphate and phosphoric acid, respectively. After the acid doping, the articles were stored under the conditions of 22 C and 62% RH for nine hours. The Comparative Example 1 showed an expansion ratio as high as 25%. It is shown that wrinkles can occur easily and special measures such as the use of a dry room must be taken in order to fabricate a membrane electrode assembly or a stack. On the other hand, the Example 1 was suppressed to an expansion ratio of 7%. Neither dimensional change nor wrinkle was observed.

TABLE 1

|  | ELASTICITY (%) |
|---|---|
| EXAMPLE 1 | 7 |
| COMPARATIVE EXAMPLE 1 | 25 |

Example 2

A membrane electrode assembly was fabricated by joining an anode to one side and joining a cathode to the other side of the fuel cell electrolyte obtained in the Example 1. The anode and the cathode were HT140E-W from E-TEK Inc. For the sake of reducing the interface resistances between the electrolyte membrane and the electrodes, the surfaces of the anode and the cathode were doped with ethylphosphonic acid and monoethyl acid phosphate. The amount of ethylphosphonic acid and monoethyl acid phosphate for the anode and the cathode to be doped with was 100% by mol with reference to the PBI.

Comparative Example 2

A membrane electrode assembly was fabricated by joining an anode to one side and joining a cathode to the other side of the fuel cell electrolyte obtained in the Example 1. The anode and the cathode were HT140E-W from E-TEK Inc. For the sake of reducing the interface resistances between the electrolyte membrane and the electrodes, the surfaces of the anode and the cathode were doped with phosphoric acid of 105% by weight. The amount of phosphoric acid for the anode and the cathode to be doped with was 800% by mol with reference to the PBI.

(Measurements on Proton Conductivity)

The fuel cell electrolytes obtained in the Example 2 and the Comparative Example 2 were loaded into respective fuel cells, and measured for proton conductivity. The proton conductivities of the fuel cells were measured at a temperature of 150° C. The flow rates of hydrogen and air were 100 and 200 (NCCM), respectively. The areas of the fuel cell electrodes were 7.8 $cm^2$.

As a result, the Comparative Example 2 showed a proton conductivity of $7 \times 10^{-2}$ S/cm while the Example 2 showed a proton conductivity of $6 \times 10^{-2}$ S/cm. This confirms that the proton conductivity of the Example 2 is at a level equivalent to that of the Comparative Example 2.

(Time Dependence in Open-Circuit Voltage and Cell Resistance)

Figure 3:
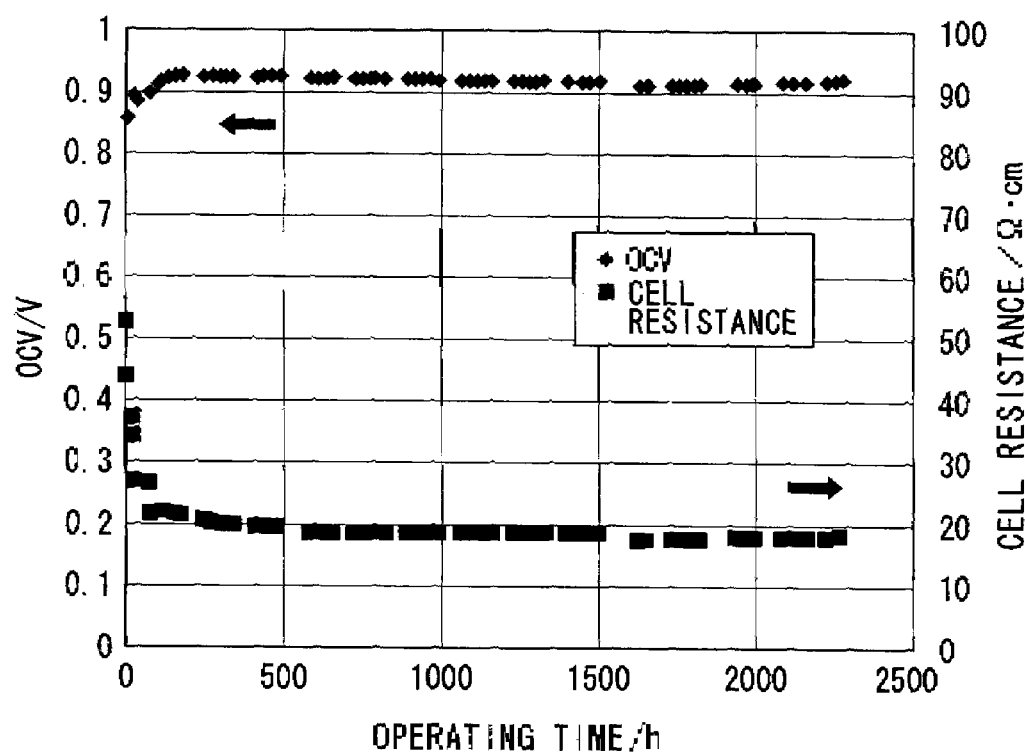
FIG. 3 is a graph showing measurements of time dependence of open circuit voltage and cell resistance in a fuel electrode electrolyte according to Example 2 at 150° C. and in a nonhumidified state.

FIG. 3 is a graph showing measurements of time dependence of open circuit voltage and cell resistance in a fuel electrode electrolyte according to Example 2 at 150° C. and in a nonhumidified state. The graph confirms a favorable result, showing that drop in open-circuit voltage or increase in cell resistance does not occur in the fuel cell electrolyte of Example 2 over a period of 2000 hours or longer.

(Measurements on Current-Voltage Characteristic)

The fuel cell electrolytes obtained in the Example 2 and the Comparative Example 2 were loaded into respective fuel cells, and measured for current-voltage characteristic in a nonhumidified state. The current-voltage characteristics of the fuel cells were measured at a temperature of 150° C. The flow rates of hydrogen and air were 100 and 200 (NCCM), respectively. The areas of the fuel cell electrodes were 7.8 $cm^2$.

Figure 4:
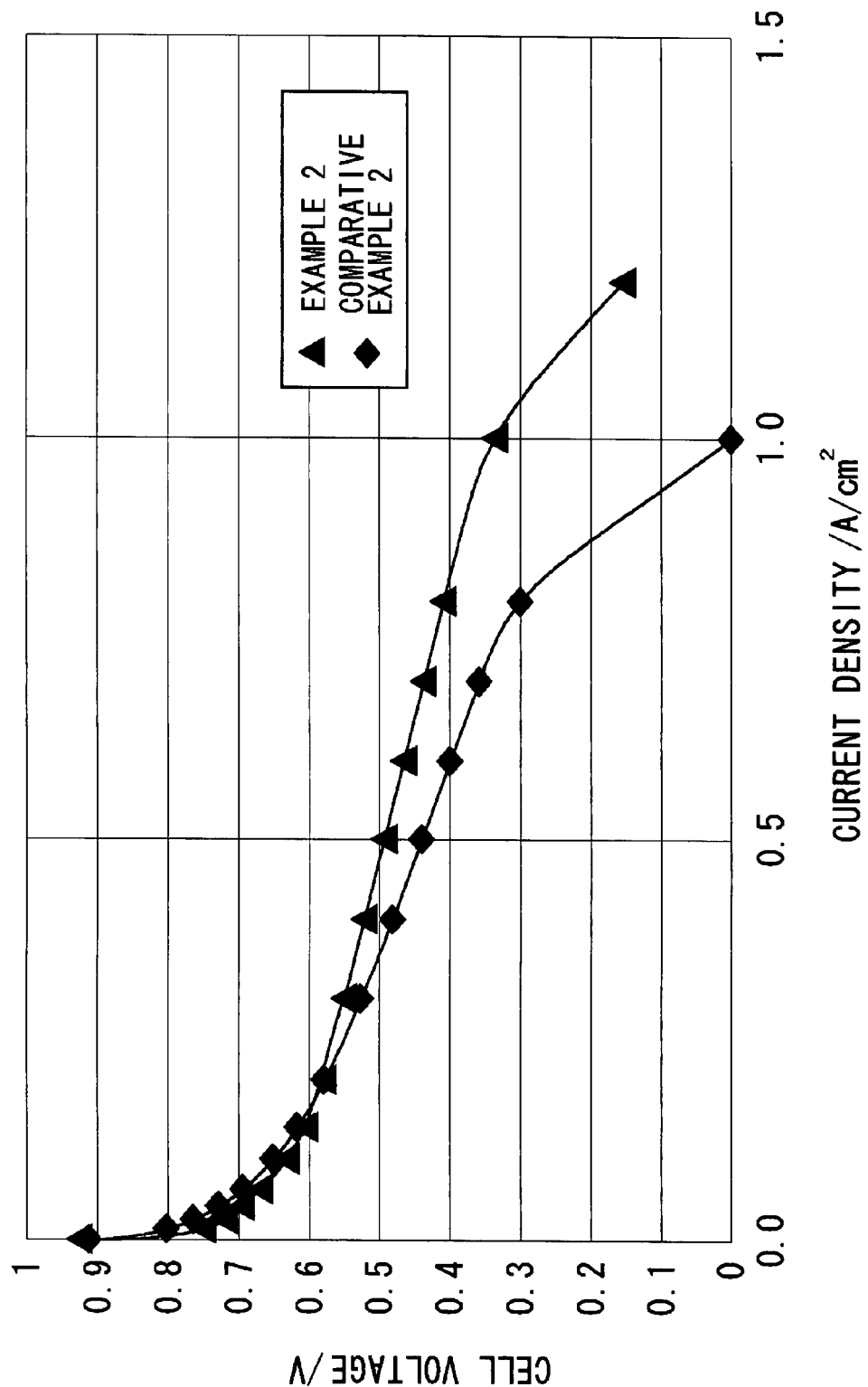
FIG. 4 is a graph showing the current-voltage characteristics of Example 2 and Comparative Example 2.

FIG. 4 is a graph for showing the current-voltage characteristics of the Example 2 and the Comparative Example 2. In the Comparative Example 2, loads up to 0.8 $A/cm^2$ were available while generating cell voltages of 0.3 (V) and higher. In the Example 2, loads as high as 1.0 $A/cm^2$ were available. This shows that the Example 2 has improved gas diffusibility.

The reason for this is considered as follows: The phosphoric acid is totally liquid, and thus has high mobility. Here, the development of wetting makes it difficult to maintain the three-phase interface formed by the catalyst, the reactive gas, and the electrolytic solution. In contrast, ethylphosphonic acid and monoethyl acid phosphate have low mobility and it is therefore easier to maintain the three-phase interface.

(Measurements from Shrinkage Test in the Fuel Cell Electrolyte)

A thermomechanical analyzer (TMA) was used to test fuel cell electrolytes for shrinkage characteristics that vary depending on whether there is a cross-linked basic polymer. More specifically, a sample was heated at 150° C. and then applied a compressive load by probe at a speed of 18 kgfcm$^-$$_2$/hr. When the compressive load reached 18 kgfcm$^{-2}$, the compressive load is maintained at a constant level. The shrinkage characteristics of the sample were obtained by measuring the displacement of the probe occurring since the start of the load application. The fuel cell electrolytes of Example 1 and Example 3 (described later) were used as samples.

Example 3

The fuel cell electrolyte of Example 3 includes cross-linked PBI doped with ethylphosphonic acid and monoethyl acid phosphate. The method of fabricating the fuel cell electrolyte of Example 3 is the same as that of Example 1 except that PBI cross-linked by a cross-linking agent was used.

Figure 5:
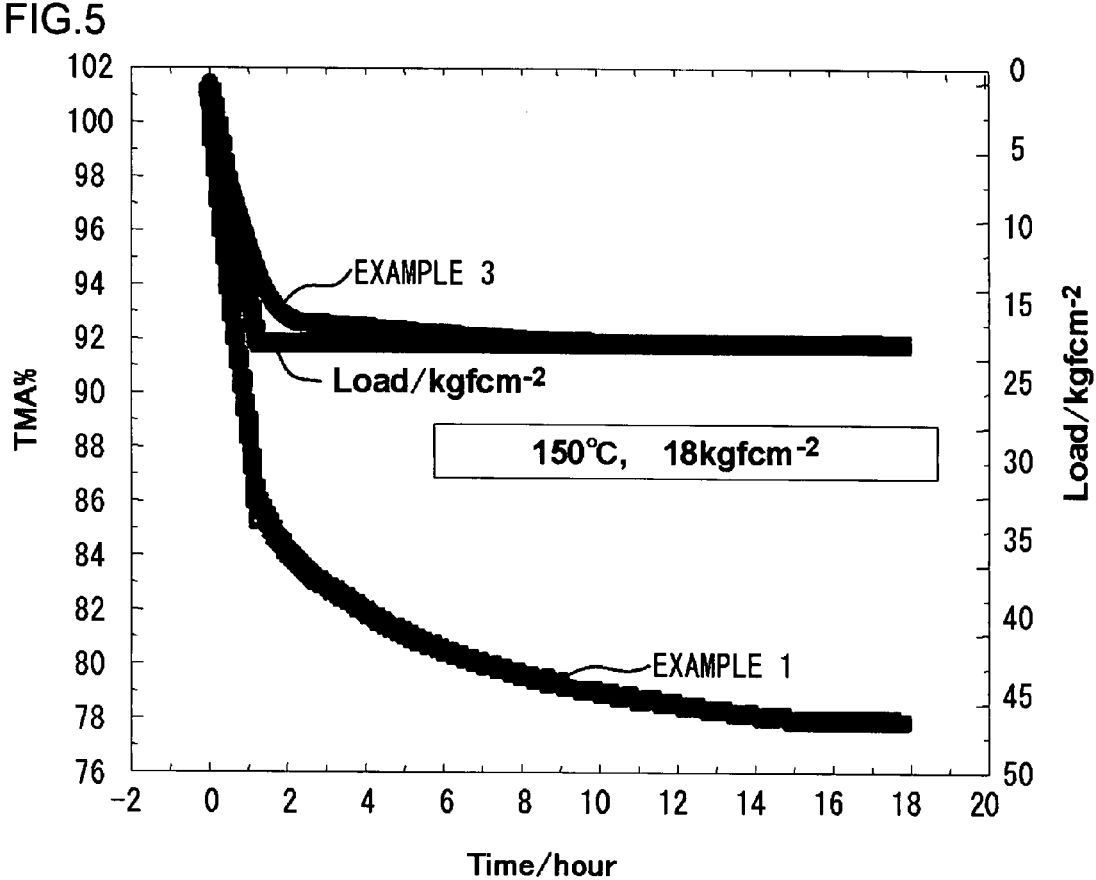
FIG. 5 is a graph showing the shrink characteristics obtained by TMA measurement on the fuel cell electrolytes of Example 1 and Example 3.

FIG. 5 is a graph showing the shrink characteristics obtained by TMA measurement on the fuel cell electrolytes of Example 1 and Example 3. In the fuel cell electrolyte in which PBI is not cross-linked (Example 1), shrinkage progresses rapidly as the compressive load is increased. Even after the compressive load is maintained at a constant level, shrinkage continues to progress slowly. In contrast, in the fuel cell electrolyte in which PBI is cross-linked (Example 3), shrinkage progresses more moderately than in Example 1 as the compressive load is increased. Shrinkage is substantially halted when the compressive load is maintained at a constant level, demonstrating that shrinkage of the fuel cell electrolyte is mitigated by cross-linking PBI.

(Measurement Results from Testing Cell Voltage Time Dependence)

The fuel cell electrolytes obtained in the Example 1 and the Example 4 described later were loaded into respective fuel cells, and measured for time dependence of output voltage in a nonhumidified state, while the current density is maintained at a constant level (0.3 A/cm$^2$). The temperature of the fuel cell was 150° C. when the output voltage was measured. The flow rates of hydrogen and air were 100 and 200 (NCCM), respectively. The areas of the fuel cell electrodes were 7.8 cm$^2$.

The anode and the cathode assembled with the fuel cell electrolyte of Example 1 and Example 4 were HT140E-W from E-TEK Inc.

Example 4

The fuel cell electrolyte of Example 4 differs from that of Example 1 in that the fuel cell electrolyte including PBI, ethylphosphonic acid and monoethyl acid phosphate is doped with phosphoric acid. The doping ratio of ethylphosphonic acid, monoethyl acid phosphate and phosphoric acid in the fuel cell electrolyte of Example 4 is 100% by mole with respect to PBI. The fuel cell electrolyte of Example 5 is obtained by doping the fuel cell electrolyte with ethylphosphonic acid and monoethyl acid phosphate, as is done in Example 1, spreading 85% phosphoric acid solution over the fuel cell electrolyte so as to dope the electrolyte with phosphoric acid of 100% by mole, and drying the electrolyte at 120° C. for two hours.

Figure 6:
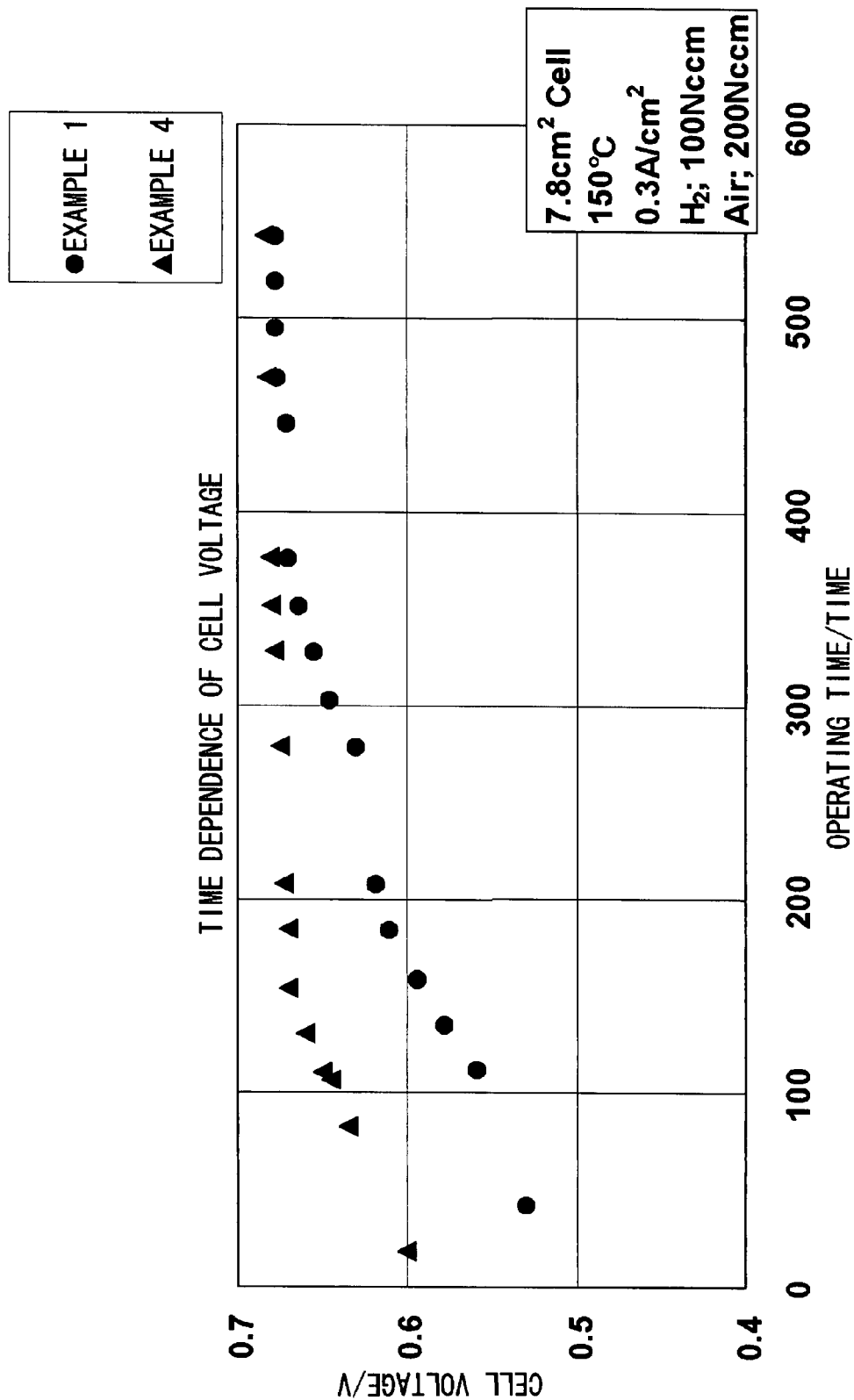
FIG. 6 is a graph showing measurements of the time dependence of a cell voltage of a fuel cell using the fuel cell electrolyte of Example 1 and Example 4.

FIG. 6 is a graph showing measurements of the time dependence of a cell voltage of a fuel cell using the fuel cell electrolyte of Example 1 and Example 4. The fuel cell using the fuel cell electrolyte of Example 4 not only exhibits improvement in cell voltage at a given point of time as compared to Example 1 but also exhibits reduced aging time elapsed before the cell voltage is brought to a constant level. This allows manufacturers to ship fuel cells earlier. As the time required to fabricate a fuel cell is reduced, the fabrication cost is reduced accordingly.

What is claimed is:

1. A fuel cell electrolyte comprising:
   a basic polymer;
   an organic phosphonic acid expressed by the following general formula (1); and
   a hydrolyzable phosphate compound expressed by the following general formula (2):

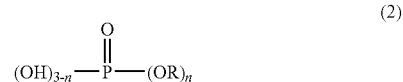

where R represents a functional group selected from alkyl, aryl, acyl, amino, phosphonic groups or a derivative of the functional group, and n is 1 or 2, and R represents an alkyl or alkoxyalkyl group, and n is 1 or 2, and
   the phosphate compound is selected from the group consisting of ethyl acid phosphate, methyl acid phosphate, butyl acid phosphate, dibutyl phosphate, monoethyl phosphate, monomethyl phosphate, and mono-n-butyl phosphate.

2. The fuel cell electrolyte according to claim 1, wherein the basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles.

3. The fuel cell electrolyte according to claim 1, wherein the basic polymer contains poly-2,5-benzimidazole.

4. The fuel cell electrolyte according to claim 1, wherein the basic polymer is cross-linked.

5. The fuel cell electrolyte according to claim 1, wherein the organic phosphonic acid is selected from the group consisting of ethylphosphonic acid, methylphosphonic acid and octylphosphonic acid.

6. The fuel cell electrolyte according to claim 1, wherein the organic phosphonic acid expressed by the following general formula (3):

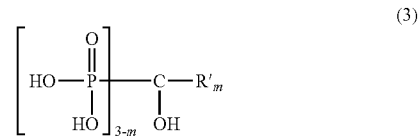

where R' represents an alkyl, aryl, acyl, amino, phosphonic group or a derivative of the functional group, and m is 1 or 2.

7. The fuel cell electrolyte according to claim 1, doped with 800 mol % or less of phosphoric acid with respect to the basic polymer as a reference.

8. The fuel cell electrolyte according to claim 1, having a water content of 20% or less.

9. The fuel cell electrolyte according to claim 1, having an expansion ratio of 20% or less.

10. A membrane electrode assembly, comprising:
    the fuel cell electrolyte according to claim 1;
    an anode joined to one side of the fuel cell electrolyte; and
    a cathode joined to another side of the fuel cell electrolyte, wherein
    at least one of the anode and the cathode contains the organic phosphonic acid expressed by the general formula (1) and/or the hydrolyzable phosphate compound expressed by the general formula (2).

11. A membrane electrode assembly, comprising:
    the fuel cell electrolyte according to claim 2;
    an anode joined to one side of the fuel cell electrolyte; and
    a cathode joined to another side of the fuel cell electrolyte, wherein
    at least one of the anode and the cathode contains the organic phosphonic acid expressed by the general formula (1) and/or the hydrolyzable phosphate compound expressed by the general formula (2).

12. A membrane electrode assembly, comprising:
    the fuel cell electrolyte according to claim 5;
    an anode joined to one side of the fuel cell electrolyte; and
    a cathode joined to another side of the fuel cell electrolyte, wherein
    at least one of the anode and the cathode contains the organic phosphonic acid expressed by the general formula (1) and/or the hydrolyzable phosphate compound expressed by the general formula (2).

13. The membrane electrode assembly according to claim 10, wherein
    at least one of the anode and the cathode contains the organic phosphonic acid selected from the group consisting of ethylphosphonic acid, methylphosphonic acid and octylphosphonic acid.

14. The membrane electrode assembly according to claim 10, wherein
    at least one of the anode and the cathode contains the phosphate compound selected from the group consisting of ethyl acid phosphate, methyl acid phosphate, butyl acid phosphate, oleyl acid phosphate, and dibutyl phosphate.

15. The membrane electrode assembly according to claim 10, wherein
    at least one of the anode and the cathode contains the phosphate compound selected from the group consisting of monoethyl phosphate, monomethyl phosphate, mono-n-butyl phosphate, and mono-n-octyl phosphate.

16. The membrane electrode assembly according to claim 10, wherein
    the total sum of the amount of the organic phosphonic acid and hydrolyzable phosphate compound contained in the fuel cell electrolyte, the amount of the organic phosphonic acid and hydrolyzable phosphate compound contained in the anode, and the amount of the organic phosphonic acid and hydrolyzable phosphate compound contained in the cathode is in the range of 100% to 800% by mol with respect to the basic polymer.

* * * * *